US012760866B2

(12) United States Patent
Ernst et al.

(10) Patent No.: US 12,760,866 B2
(45) Date of Patent: Oct. 13, 2026

(54) LAMP AND LIGHTING EQUIPMENT

(71) Applicant: Astera Manufacturing Limited, Shenzhen (CN)

(72) Inventors: Norbert Ernst, Shenzhen (CN); Simon Canins, Munich (DE)

(73) Assignee: Astera Manufacturing Limited, Shenzhen (CN)

( * ) Notice: Subject to any disclaimer, the term of this patent is extended or adjusted under 35 U.S.C. 154(b) by 0 days.

(21) Appl. No.: 19/325,594

(22) Filed: Sep. 11, 2025

(65) Prior Publication Data

US 2026/0085816 A1 Mar. 26, 2026

(30) Foreign Application Priority Data

Sep. 26, 2024 (CN) ........................ 202422362525.1

(51) Int. Cl.
*F21V 14/06* (2006.01)
*F21S 2/00* (2016.01)
(Continued)

(52) U.S. Cl.
CPC ................ *F21V 14/06* (2013.01); *F21S 2/00* (2013.01); *F21S 8/02* (2013.01); *F21S 9/02* (2013.01);
(Continued)

(58) Field of Classification Search
CPC ......... F21V 14/06; F21V 29/78; H05B 47/19; F21S 2/00; F21S 8/02; F21S 9/02
See application file for complete search history.

(56) References Cited

U.S. PATENT DOCUMENTS 6,115,197 A * 9/2000 Funahashi .............. G02B 7/102 359/701
6,529,338 B2 * 3/2003 Cheung .................... G02B 7/10 359/701
(Continued)

FOREIGN PATENT DOCUMENTS

CN 212840954 U 3/2021
CN 116917665 A 10/2023
(Continued)

OTHER PUBLICATIONS

Provisional Opinion Accompanying the Partialsearch Results Dated Feb. 16, 2026; Application No. 25203636.3; EPO Form 1703 01.91 TRI (6 Pages).

*Primary Examiner* — Bryon T Gyllstrom
(74) *Attorney, Agent, or Firm* — Luedeka Neely, P.C.; Mark P. Crockett

(57) ABSTRACT

A lamp and a lighting equipment are disclosed. The lamp includes a fixed base, a light source, a lens, and a movable ring. The light source is fixed in the fixed base. A light output surface of the light source faces the lens. The lens is fixedly connected to the movable ring. One of the fixed base and the movable ring includes a sliding block, and another of the fixed base and the movable ring includes a sliding groove. Two ends of the sliding groove are spaced apart along a radial direction of the lens and are spaced apart along a circumferential direction of the lens. The sliding block is slidably arranged in the sliding groove. When the movable ring is rotated relative to the fixed base, the sliding block slides along the sliding groove, to change a distance between the lens and the light source.

12 Claims, 4 Drawing Sheets

(51) Int. Cl.

| | |
|---|---|
| ***F21S 8/02*** | (2006.01) |
| ***F21S 9/02*** | (2006.01) |
| ***F21V 29/78*** | (2015.01) |
| ***F21Y 115/10*** | (2016.01) |
| ***H05B 47/19*** | (2020.01) |

(52) U.S. Cl.
CPC ............. *F21V 29/78* (2015.01); *H05B 47/19* (2020.01); *F21Y 2115/10* (2016.08)

(56) References Cited

U.S. PATENT DOCUMENTS

| | | | | |
|---|---|---|---|---|
| 6,961,189 | B2 * | 11/2005 | Nishimura | G02B 7/021 359/701 |
| 8,885,266 | B2 * | 11/2014 | Uno | G03B 11/043 359/699 |
| 9,256,050 | B2 * | 2/2016 | Kang | G02B 7/10 |
| 10,788,647 | B2 * | 9/2020 | Minor | G02B 7/10 |
| 11,300,259 | B1 | 4/2022 | Cohen | |
| 2010/0290229 | A1 | 11/2010 | Meyer, Sr. et al. | |
| 2014/0140065 | A1 * | 5/2014 | Scott | F21V 29/763 362/294 |
| 2017/0307196 | A1 * | 10/2017 | Matsui | F21V 14/00 |
| 2021/0239937 | A1 * | 8/2021 | Shirono | G02B 7/09 |

FOREIGN PATENT DOCUMENTS

| | | | |
|---|---|---|---|
| EP | 3299709 | A1 | 3/2018 |
| JP | 2014150009 | A | 8/2014 |
| JP | 2016213067 | A | 12/2016 |

* cited by examiner

LAMP AND LIGHTING EQUIPMENT

CROSS-REFERENCE TO RELATED APPLICATION

This application is based on and claims the benefit of priority from Chinese Patent Application No. 202422362525.1, filed on 26 Sep. 2024, the entirety of which is incorporated by reference herein.

TECHNICAL FIELD

The present disclosure relates to the technical field of lighting, and in particular, to a lamp and a lighting equipment.

BACKGROUND

The beam angle refers to an angle at which a beam is emitted from a light source or lamp, i.e., an angle formed by the beam at the boundary of a certain intensity range. The beam angle affects the lighting effect, and different beam angles are suitable for different scenarios. Narrow beam angles are suitable for scenarios that require concentrated lighting, such as stage lighting or scenarios where specific objects need to be highlighted through light. Medium beam angles are suitable for scenarios that require a range of lighting, such as home lighting or lighting in commercial spaces. Wide beam angles are suitable for scenarios that require extensive lighting, such as offices or large shopping malls.

Lamps with adjustable beam angles exist in the existing technology. The basic principle of such lamps is to change the distance between the lens and the light source, thereby changing the beam angle. The structure for adjusting the beam angle in the existing technology is complicated and costly.

SUMMARY

The present disclosure aims to resolve at least one of the technical problems in the related art. Therefore, the present disclosure provides a lamp, which realizes the adjustment of the beam angle by a simple and cost-effective structure.

The present disclosure further provides a lighting equipment including the lamp.

In accordance with a first aspect of the present disclosure, an embodiment provides a lamp, including: a fixed base; a light source fixed in the fixed base; a lens, where a light output surface of the light source faces the lens; a movable ring, where the lens is fixedly connected to the movable ring, one of the fixed base and the movable ring includes a sliding block, another of the fixed base and the movable ring includes a sliding groove, two ends of the sliding groove are spaced apart along a radial direction of the lens and are spaced apart along a circumferential direction of the lens, the sliding block is slidably arranged in the sliding groove, and when the movable ring is rotated relative to the fixed base, the sliding block slides along the sliding groove, to change a distance between the lens and the light source.

The lamp of the embodiment of the first aspect of the present disclosure has the following beneficial effects. In the existing technology, the beam angle is changed by using a motor and a lead screw to drive a housing mounted with a lens to move relative to a fixed base. Such a design has the problems of complicated structure and high costs. The present disclosure does not require the use of a motor and a lead screw. In the present disclosure, the movable ring and the fixed base are respectively provided with the sliding block and the inclined sliding groove, such that a user can change the beam angle of the lamp by rotating the movable ring mounted with the lens. The beam angle of the lamp of the present disclosure can be conveniently adjusted, and the structure for adjusting the beam angle in the lamp is simple and cost-effective.

According to some embodiments of the present disclosure, the lamp further includes a light guide column fixed in the fixed base and located between the light output surface and the lens.

According to some embodiments of the present disclosure, the lamp further includes a light shield detachably connected to an end of the movable ring away from the light source, where the light shield is arranged at a periphery of the lens.

According to some embodiments of the present disclosure, the movable ring includes an annular connection portion, the connection portion includes an end face and a first outer peripheral surface, the end face is located at an end of the connection portion away from the light source, and the first outer peripheral surface surrounds the end face; and the light shield includes a buckle, the first outer peripheral surface is provided with an engagement groove, the engagement groove includes an axial segment and a circumferential segment, the axial segment extends along an axial direction of the movable ring, the circumferential segment extends along a circumferential direction of the movable ring, the buckle is slidable in the axial segment and the circumferential segment, one end of the axial segment extends to the end face to form an opening allowing the buckle to pass through on the end face, and another end of the axial segment is in communication with one end of the circumferential segment.

According to some embodiments of the present disclosure, the movable ring includes a main body and a plurality of anti-skid protrusions, the main body is annular and includes a second outer peripheral surface, the anti-skid protrusions are connected to the second outer peripheral surface and protrude relative to the second outer peripheral surface, and the plurality of anti-skid protrusions are distributed along a circumferential direction of the movable ring.

According to some embodiments of the present disclosure, the fixed base includes: an inner cylinder, where the movable ring is sleeved over the inner cylinder, the sliding block is provided on one of the inner cylinder and the movable ring, and the sliding groove is provided on another of the inner cylinder and the movable ring; and a radiator, fixedly connected to the inner cylinder, including a plurality of radiator fins, and sleeved over the inner cylinder and the movable ring.

According to some embodiments of the present disclosure, the lamp further includes: a socket fixedly connected to the radiator, exposed out of the radiator, and electrically connected to the light source; and a screw cap connected to the radiator, exposed out of the radiator, and electrically connected to the light source.

In accordance with a second aspect of the present disclosure, an embodiment provides a lighting equipment, including: a plurality of lamps, each being the lamp as described in the embodiment of the first aspect; a box including a plurality of recesses, where each of the recesses is configured to receive a respective one of the lamps; and a power module mounted on the box and electrically connected to the lamps in the respective recesses.

The lighting equipment of the embodiment of the second aspect of the present disclosure has the following beneficial effects. The lighting equipment may integrate a plurality of lamps, to achieve a high lighting brightness. In addition, because the beam angle of the lamp can be adjusted, the light output effect of the lighting equipment can be flexibly adjusted. Moreover, the lamps can be detached from the recesses, so that a user can adjust the number of lamps mounted in the box according to a required brightness of lighting or other requirements.

According to some embodiments of the present disclosure, the lighting equipment further includes infrared emitters. One or more of the infrared emitters are arranged in each of the recesses, each of the lamps further includes an infrared receiver, the infrared receiver is exposed out of the fixed base, and the infrared receiver is capable of receiving a signal from the respective infrared emitter when the respective lamp is arranged in the respective recess. The box includes a first wireless communication module, each of the lamps further includes a control assembly, the control assembly is configured to control an operational status of the respective lamp, the control assembly includes a second wireless communication module, and the first wireless communication module is communicatively connected to the second wireless communication module.

According to some embodiments of the present disclosure, the first wireless communication module includes at least one of a Bluetooth module, a digital multiplexer (DMX) module, a cognitive radio multiplexer (CRMX) module, an ultra-high frequency electromagnetic wave (UHF) module, and a 2.4 G Wi-Fi module; and the second wireless communication module includes at least one of a Bluetooth module, a DMX module, a CRMX module, a UHF module, and a 2.4G Wi-Fi module.

Additional aspects and advantages of the present disclosure will be partly given in and partly apparent from the description below, or understood through practice of the present disclosure.

BRIEF DESCRIPTION OF DRAWINGS

The present disclosure is further described below with reference to the accompanying drawings and embodiments. In the drawings.

REFERENCE NUMERALS

Figure 1:
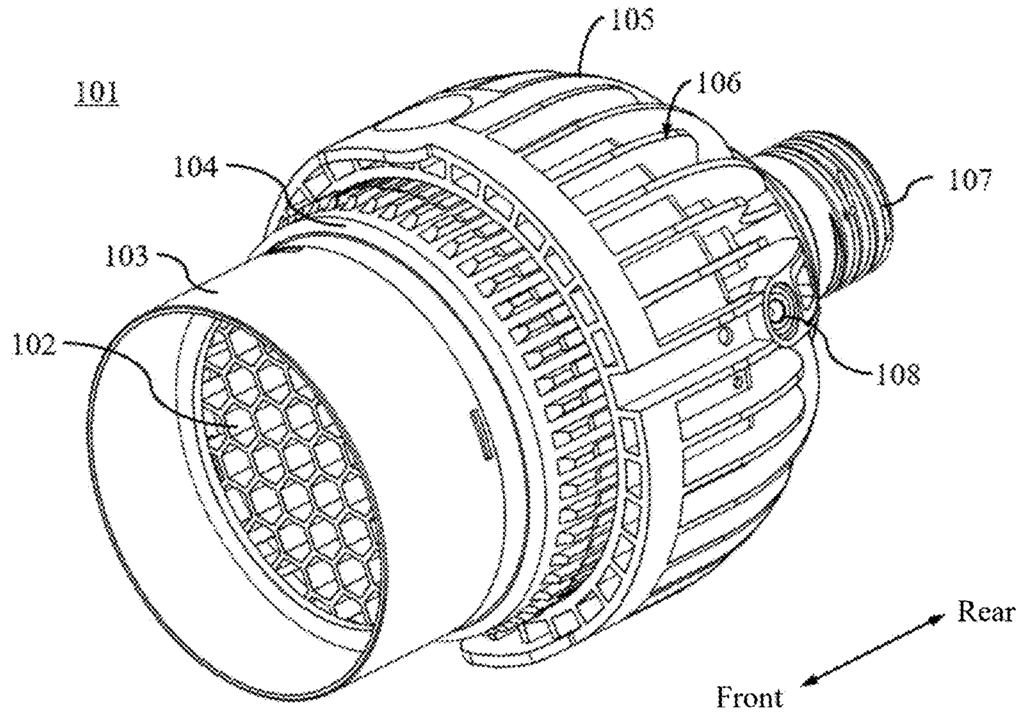
FIG. 1 is a schematic view of a lamp according to an embodiment of the present disclosure.

101—lamp, 102—grid, 103—light shield, 104—movable ring, 105—fixed base, 106—radiator fin, 107—screw cap, 108—socket, 109—lens, 110—glass sheet, 111—mounting shell, 112—light blocking sleeve, 113—light guide column, 114—circuit board assembly, 115—light source, 116—inner cylinder, 117—radiator, 118—main body, 119—sliding block, 120—beam angle scale, 121—anti-skid protrusion, 122—sliding groove, 123—annular protrusion, 124—engagement groove, 125—axial segment, 126—circumferential segment, 127—end face, 128—first outer peripheral surface, 129—limiting surface, 130—second outer peripheral surface, 131—cavity, 132—opening, 201—plug, 202—cable, 300—lighting equipment, 301—box, 302—indicator light, 303—recess, 304—central region, 305—peripheral region, 306—control assembly.

DETAILED DESCRIPTION

Embodiments of the present disclosure will be described in detail below with reference to the accompanying drawings, in which the same or like reference characters refer to the same or like elements or elements having the same or like functions throughout. The embodiments described below by reference to the accompanying drawings are exemplary and are intended for explanation only and are not to be construed as limiting the present disclosure.

In the description of the present disclosure, it should be understood that for the description of orientations, the orientation or positional relationships indicated by the terms such as "on," "below," "front," "rear," "left," and "right" are based on orientation or position relationships shown in the accompanying drawings, and are used only for ease and brevity of illustration and description, rather than indicating or implying that the mentioned apparatus or element must have a particular orientation or must be constructed and operated in a particular orientation. Therefore, such terms should not be construed as limiting of the present disclosure.

In the description of the present disclosure, the term "at least one" means one or more, the term "plurality of" (or multiple) means at least two, the term such as "greater than," "less than," "exceed" or variants thereof prior to a number or series of numbers is understood to not including the number adjacent to the term. The term "at least" prior to a number or series of numbers is understood to include the number adjacent to the term "at least," and all subsequent numbers or integers that could logically be included, as clear from context. If used herein, the terms such as "first," "second" and the like are merely used for distinguishing technical features, and are not intended to indicate or imply relative importance, or implicitly point out the number of the indicated technical features, or implicitly point out the order of the indicated technical features.

In the description of the present disclosure, unless otherwise explicitly defined, the terms such as "configure," "install/mount" and "connect" should be understood in a broad sense, and those having ordinary skill in the art can reasonably determine the specific meanings of the above terms in the present disclosure based on the specific contents of the technical scheme.

FIG. 1 to FIG. 7 show a lamp 101 according to an embodiment of the present disclosure. The lamp 101 includes a fixed base 105, a light source 115, a lens 109, and a movable ring 104. The light source 115 is fixed in the fixed base 105. A light output surface of the light source 115 faces the lens 109. Light emitted from the light output surface can pass through the lens 109 and be emitted outward. The lens 109 may be a Fresnel lens or another type of lens 109. When the lens 109 is a Fresnel lens, the lens 109 includes a helical surface provided with a plurality of concentric annular protrusions and facing away from the light source 115. The lens 109 is fixedly connected to the movable ring 104, and the movable ring 104 is movable relative to the fixed base 105.

Figure 3:
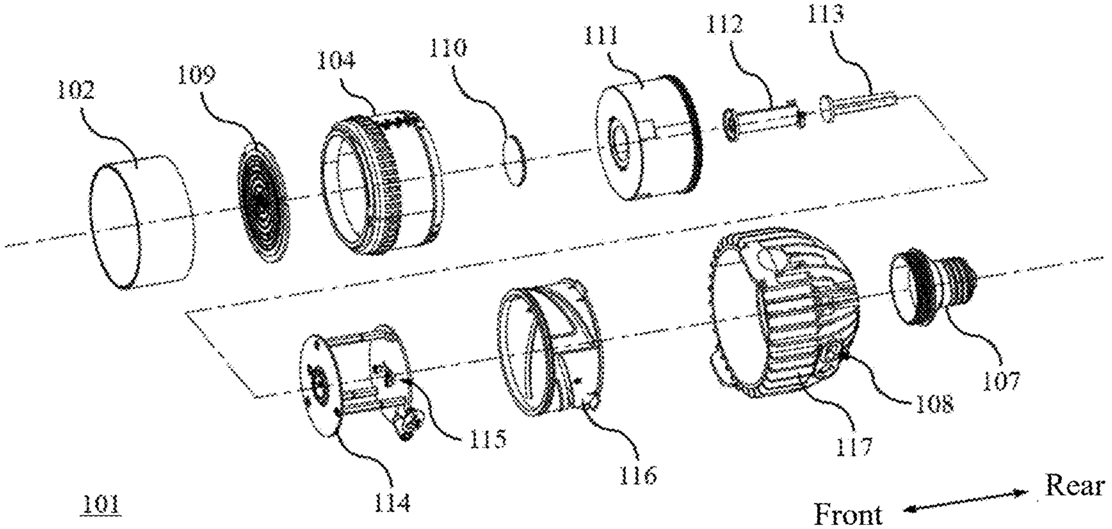
FIG. 3 is an exploded view of a lamp.

As shown in FIG. 3, the lamp 101 includes a circuit board assembly 114, which may include a printed circuit board (PCB) or a plurality of PCBs fixed to each other. The light source 115 is part of the circuit board assembly 114, and is mounted on one of the PCBs. The light source 115 may be a light-emitting diode (LED) chip.

Figure 4:
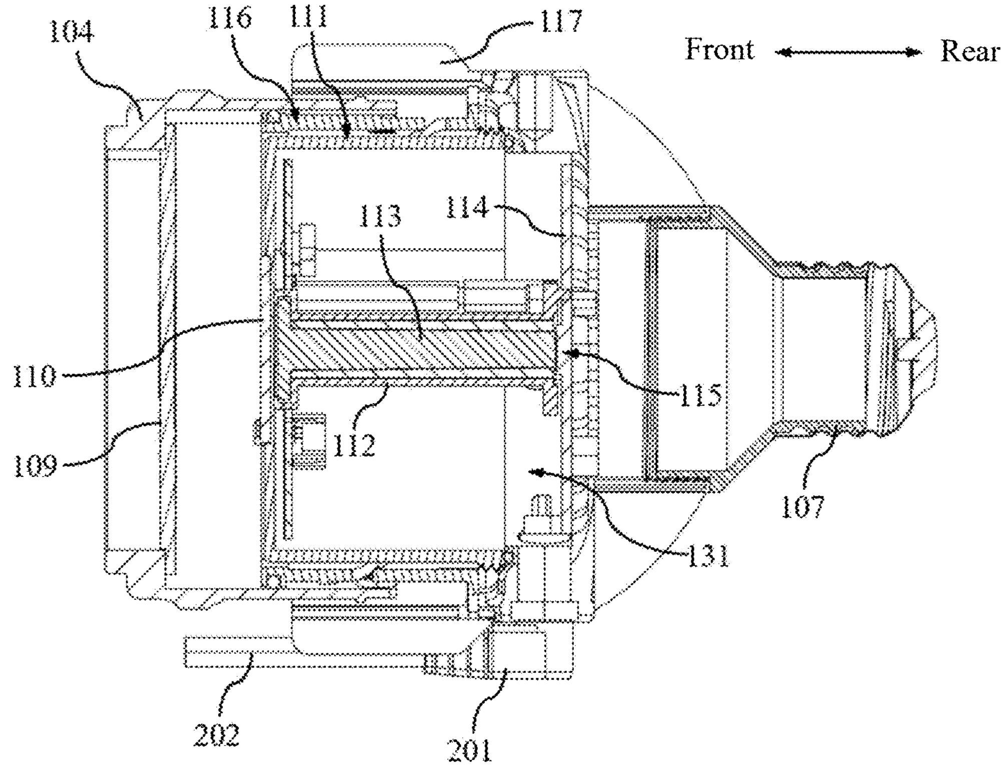
FIG. 4 is a sectional view of a lamp.

Referring to FIG. 1 and FIG. 3, in this embodiment, the fixed base 105 includes a radiator 117, an inner cylinder 116, a mounting shell 111, and a screw cap 107. As shown in FIG. 4, the mounting shell 111 is arranged inside the radiator 117, and the mounting shell 111 is fixed to the radiator 117 by threaded connection. The inner cylinder 116 is sleeved over the mounting shell 111, and the inner cylinder 116 is also located inside the radiator 117. The inner cylinder 116 may be fixed to the mounting shell 111 by a screw. A rear end of the radiator 117 is fixedly connected to the screw cap 107. The circuit board assembly 114 is electrically connected to the screw cap 107, for example, by a wire not shown. The screw cap 107 may be connected to an external screw socket, such that an external power source supplies power to the light source 115 through the screw socket. The screw cap 107 may be an E27, E26, or B22 screw cap, etc. As shown in FIG. 4, the mounting shell 111 and the radiator 117 jointly define a cavity 131, the circuit board assembly 114 is mounted in the cavity 131, and the circuit board assembly 114 may be connected to the mounting shell 111 and/or the radiator 117 by a screw. Thus, the light source 115 can be positioned in the fixed base 105. The radiator 117 includes a plurality of radiator fins 106. The radiator 117 can dissipate heat from the circuit board assembly 114 to prevent the temperature of the circuit board assembly 114 from being too high.

As shown in FIG. 4, the movable ring 104 is sleeved over the inner cylinder 116, and the radiator 117 is sleeved over the inner cylinder 116 and the movable ring 104. In other words, in a radial direction of the movable ring 104, the movable ring 104 is located between the inner cylinder 116 and the radiator 117. The lens 109 is fixedly connected to the movable ring 104. The lens 109 may be arranged inside the movable ring 104. The lens 109 may be fixed to the movable ring 104 by threaded connection, snap-fit, adhesion, etc.

Figure 5:
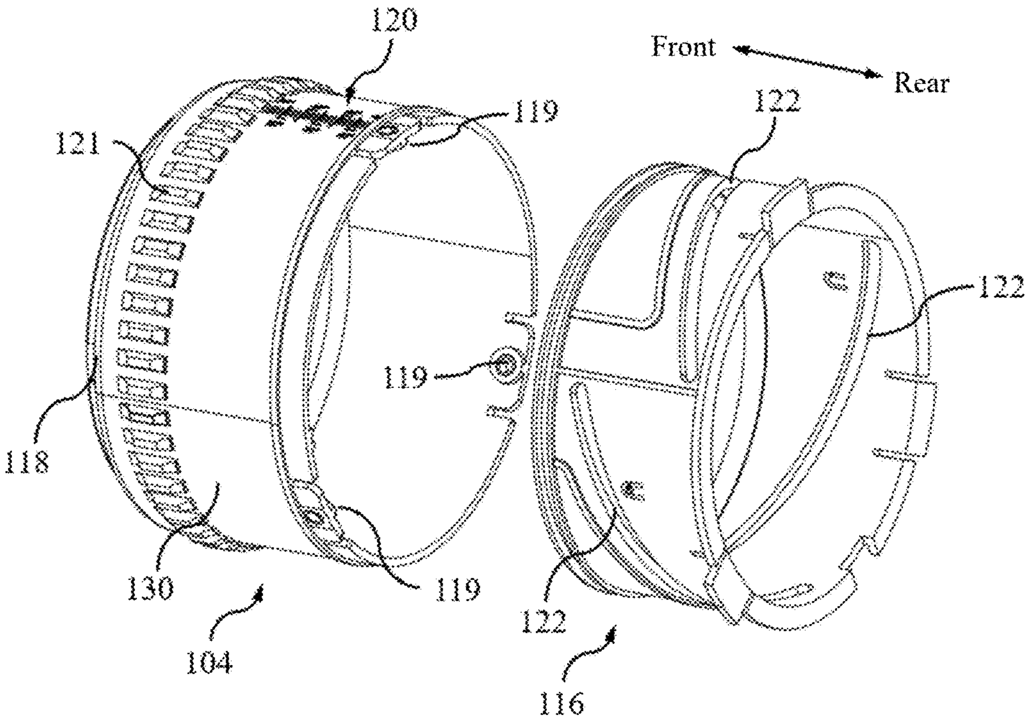
FIG. 5 is a schematic view of a movable ring and an inner cylinder.

The movable ring 104 includes a sliding block 119, the fixed base 105 is provided with a sliding groove 122, and the sliding block 119 is slidably arranged in the sliding groove 122, such that the movable ring 104 can move relative to the fixed base 105. Referring to FIG. 5, the movable ring 104 includes a main body 118 and a sliding block 119, the main body 118 is annular, and the sliding block 119 is connected to an inner peripheral surface of the main body 118. In addition, in order to reduce resistance to sliding of the sliding block 119, the sliding block 119 may be designed to be cylindrical. The sliding groove 122 is located on the inner cylinder 116 of the fixed base 105. Two ends of the sliding groove 122 are spaced apart along a circumferential direction of the movable ring 104 and are spaced apart along an axial direction of the movable ring 104 (i.e., a front-rear direction in the drawings). In other words, the sliding groove 122 is inclined relative to an axis of the movable ring 104. As such, when the movable ring 104 is rotated relative to the fixed base 105, the sliding block 119 slides along the sliding groove 122, and the movable ring 104 also moves relative to the fixed base 105 along the axial direction of the movable ring 104. Accordingly, a distance between the lens 109 fixed in the movable ring 104 and the light source 115 fixed in the fixed base 105 is changed, thereby changing the beam angle of the lamp 101. For example, taking FIG. 5 as an example, when the movable ring 104 is rotated clockwise relative to the inner cylinder 116 of the fixed base 105 (viewed from rear to front), the movable ring 104 moves forward, and the distance between the lens 109 and the light source 115 increases. On the contrary, when the movable ring 104 is rotated counterclockwise relative to the inner cylinder 116 of the fixed base 105 (viewed from rear to front), the movable ring 104 moves backward, and the distance between the lens 109 and the light source 115 increases. Generally, a longer distance between the lens 109 and the light source 115 indicates a longer light path in the lamp 101 and a smaller beam angle. The distance between the lens 109 and the light source 115 is a distance between the lens 109 and the light source 115 in an axial direction of the lens 109.

In the existing technology, the beam angle is changed by using a motor and a lead screw to drive a housing mounted with a lens to move. Such a design has the problems of complicated structure and high costs. The present disclosure does not require the use of a motor and a lead screw. In the present disclosure, the movable ring 104 and the fixed base 105 are respectively provided with a sliding block 119 and an inclined sliding groove 122, such that a user can change the beam angle of the lamp 101 by rotating the movable ring 104 mounted with the lens 109. The beam angle of the lamp 101 of the present disclosure can be conveniently adjusted, and the structure for adjusting the beam angle in the lamp 101 is simple and cost-effective. In some embodiments, an adjustment range of the beam angle may be set to 15° to 50°.

As shown in FIG. 5, in this embodiment, the sliding block 119 is arranged on the movable ring 104, and the sliding groove 122 is arranged on the inner cylinder 116 of the fixed base 105. In some other embodiments not shown, the sliding block 119 may be arranged on the inner cylinder 116, and the sliding groove 122 may be arranged on the movable ring 104. Alternatively, in some other embodiments not shown, the sliding block 119 is arranged on the movable ring 104, and the sliding groove 122 is arranged on an inner surface of the radiator 117. Alternatively, in some other embodiments not shown, the sliding block 119 is arranged on the inner surface of the radiator 117, and the sliding groove 122 is arranged on the movable ring 104. Feasible arrangement methods of the sliding block 119 and the sliding groove 122 will not be enumerated herein, and the function of adjusting the beam angle can be realized as long as the sliding block 119 and the sliding groove 122 are respectively arranged on the movable ring 104 and the fixed base 105 and the sliding groove 122 is inclined.

As shown in FIG. 5, in this embodiment, three sliding blocks 119 and three sliding grooves 122 are provided, which is conducive to improve the stability of the movable ring 104 during rotation. However, the number of sliding blocks 119 and the number of sliding grooves 122 are not strictly limited. For example, to reduce the processing difficulty of the inner cylinder 116 and the movable ring 104, in some other embodiments, the number of the sliding blocks 119 and the number of the sliding grooves 122 may both be set to one.

In addition, in the above embodiments, the fixed base 105 includes the inner cylinder 116, the mounting shell 111, the radiator 117, and the screw cap 107. In some other embodiments not shown, the number of components included in the fixed base 105 may be appropriately reduced. For example, the inner cylinder 116 and the mounting shell 111 may be combined as one part. For another example, the screw cap 107 may be omitted. For another example, in a case where the power of the lamp 101 is low, the radiator 117 may be omitted.

As shown in FIG. 4, in some embodiments, the lamp 101 further includes a light guide column 113. The light guide column 113 is made of a light transmissive material, which may be glass, transparent plastic, etc. The light guide column 113 is configured to transmit light from the light source 115 to another location with a low loss. The light is transmitted within the light guide column 113 mainly by total internal reflection. The material of the light guide column 113 may be acrylic resin, polycarbonate, epoxy resin, glass, etc. The material of the light guide column 113 may be a material having a high light transmittance. For example, the light transmittance of the material may be greater than 90%. The light guide column 113 is fixed in the fixed base 105. Particularly, the light guide column 113 is located in the mounting shell 111. The light guide column 113 is located between the light output surface of the light source 115 and the lens 109. The light emitted from the light source 115 first passes through the light guide column 113 and then passes through the lens 109. The light guide column 113 is configured to guide the light to the lens 109, to ensure that sufficient light can pass through the lens 109 and be emitted out. As shown in FIG. 3 and FIG. 4, the lamp 101 further includes a light blocking sleeve 112. The light blocking sleeve 112 is made of an opaque material (e.g., black plastic, black rubber, etc.). The light blocking sleeve 112 is sleeved over the light guide column 113. Two ends of the light blocking sleeve 112 are connected to the circuit board assembly 114. The light blocking sleeve 112 can reduce the loss of light, thereby increasing the illumination intensity of the light emitted from the lens 109.

As shown in FIG. 3 and FIG. 4, in some embodiments, the lamp 101 further includes a glass sheet 110, the glass sheet 110 is snap-fitted to a front end of the mounting shell 111, and the glass sheet 110 is located between the lens 109 and the light guide column 113. In some embodiments, the glass sheet 110 may be configured as an optical filter to filter out light of a specific wavelength. In some other embodiments, a specific pattern may be provided on the glass sheet 110, and the corresponding pattern may be shown after the light is emitted out through the lens 109.

As shown in FIG. 1 and FIG. 3, in some embodiments, the lamp 101 further includes a light shield 103 detachably connected to an end of the movable ring 104 away from the light source 115, where the light shield 103 is arranged at a periphery of the lens 109. The light shield 103 may be configured in a cylindrical shape. The light shield 103 is made of an opaque material. The light shield 103 may be connected to the movable ring 104 by snap-fit, threaded connection, magnetic connection, etc. The light shield 103 can concentrate the light emitted from the lamp 101. The beam angle of the lamp 101 can also be changed by removing the light shield 103 or mounting the light shield 103. In addition, in some embodiments, to enable the lamp 101 to provide a specific light output effect, the lamp 101 may further include a grid 102 (as shown in FIG. 1), and the grid 102 is fixed in the light shield 103. Blocks of the grid 102 are hexagonal, and the grid 102 is honeycomb-shaped.

Figure 6:
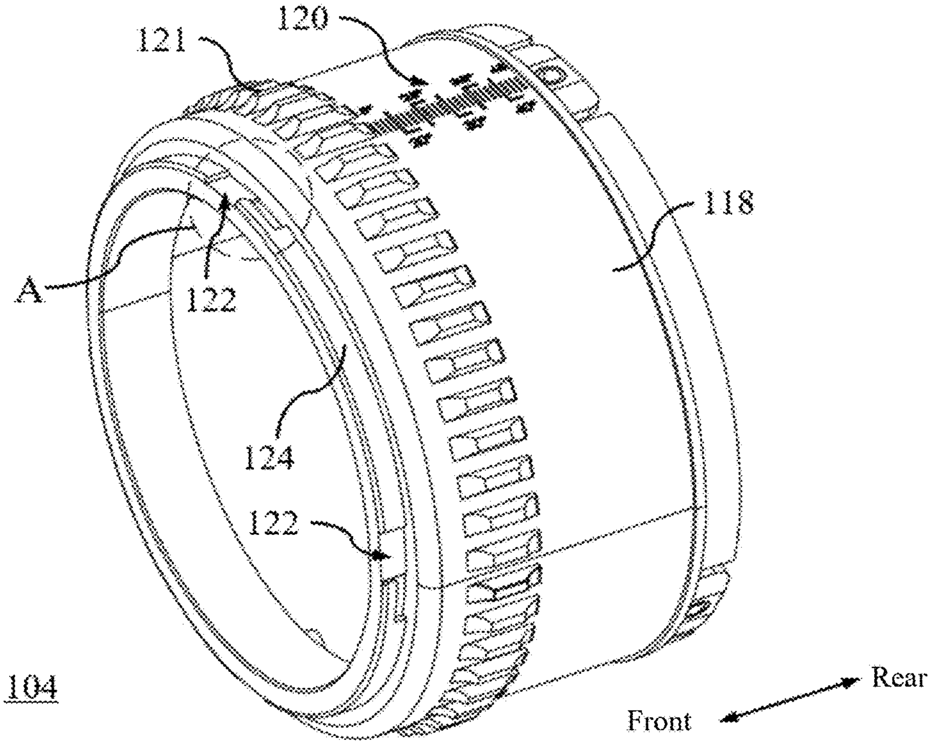
FIG. 6 is a schematic view of a movable ring from another viewing angle.
Figure 7:
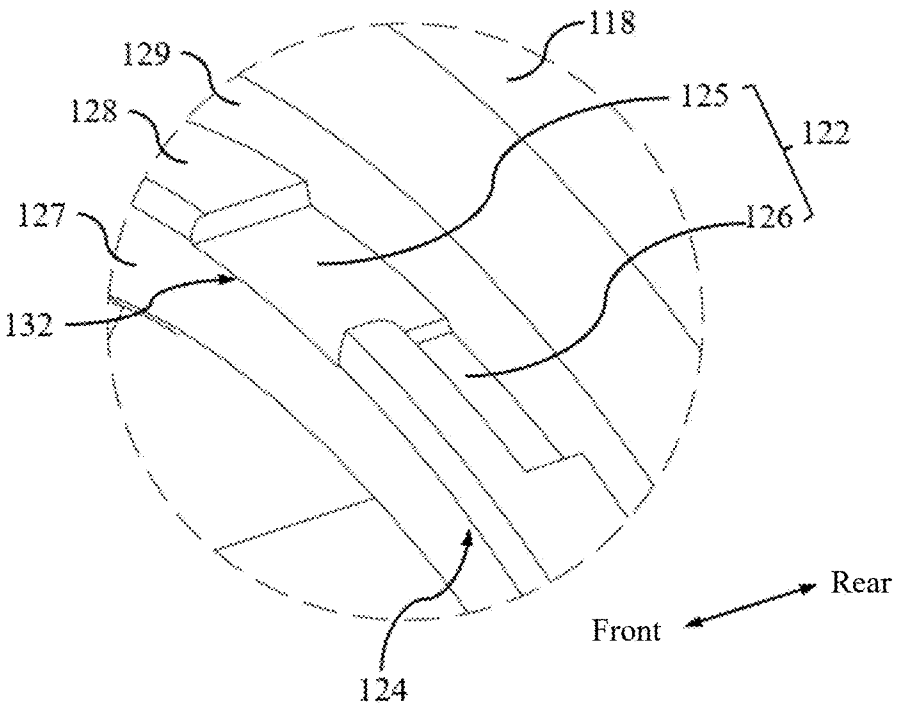
FIG. 7 is an enlarged view of part A in FIG. 6.

When the light shield 103 is snap-fit to the lens 109, snap-fit structures provided on the movable ring 104 are shown in FIG. 6 and FIG. 7. As shown in FIG. 6, in some embodiments, the movable ring 104 further includes an annular connection portion, and the connection portion is connected to one end of the main body 118. As shown in FIG. 7, the connection portion includes an end face 127 and a first outer peripheral surface 128, the end face 127 is located at an end of the connection portion away from the light source 115 (i.e., the end face 127 is located at a front end of the connection portion), and the first outer peripheral surface 128 surrounds the end face 127. The first outer peripheral surface 128 is provided with an engagement groove 124. The engagement groove 124 is L-shaped. The engagement groove 124 includes an axial segment 125 and a circumferential segment 126. The axial segment 125 extends along the axial direction of the movable ring 104. The circumferential segment 126 extends along the circumferential direction of the movable ring 104. The light shield 103 further includes a buckle (not shown). One end of the axial segment 125 extends to the end face 127 to form an opening 132 allowing the buckle to pass through on the end face 132. The other end of the axial segment 125 is in communication with one end of the circumferential segment 126. The buckle is slidable in the axial segment 125 and the circumferential segment 126.

To mount the light shield 103, a user may move the light shield 103 from front to rear, to cause the buckle to enter the axial segment 125 from front to rear. After the buckle is moved to a rear end of the axial segment 125, the user may rotate the light shield 103 clockwise (viewed from front to rear) to cause the buckle to enter the circumferential segment 126, thereby achieving snap-fit of the light shield 103 with the lens 109. To remove the light shield 103, a user may first rotate the light shield 103 counterclockwise to move the buckle to the rear end of the axial segment 125, and then withdraw the light shield 103 from rear to front.

As shown in FIG. 7, in some embodiments, the main body 118 includes a limiting surface 129 located at an end of the main body 118 away from the light source 115 (i.e., a front end of the main body 118). The connection portion is connected to the limiting surface 129 and protrudes relative to the limiting surface 129. The limiting surface 129 is configured to limit a movement of the light shield 103 from front to rear, making it convenient for the user to mount the light shield 103.

As shown in FIG. 5, in some embodiments, the movable ring 104 further includes a plurality of anti-skid protrusions 121, the main body 118 includes a second outer peripheral surface 130, the anti-skid protrusions 121 are connected to the second outer peripheral surface 130 and protrude relative to the second outer peripheral surface 130, and the plurality of anti-skid protrusions 121 are distributed along the circumferential direction of the movable ring 104. When a user rotates the movable ring 104, the user may grip the anti-skid protrusions 121 with fingers or a palm and twist the movable ring 104. The anti-skid protrusions 121 are conducive to reducing the risk of the user's hand skidding on the movable ring 104, making it convenient for the user to adjust the beam angle of the lamp 101.

As shown in FIG. 5, in some embodiments, to enable a user to accurately adjust the beam angle, a beam angle scale 120 is further provided on the second outer peripheral surface 130. As the position of the movable ring 104 changes, a part of the beam angle scale 120 exposed out of the radiator 117 also changes, and a user may determine a current beam angle of the lamp 101 through the exposed part of the beam angle scale 120, to determine whether the beam angle of the lamp 101 has been adjusted to a required angle.

Figure 2:
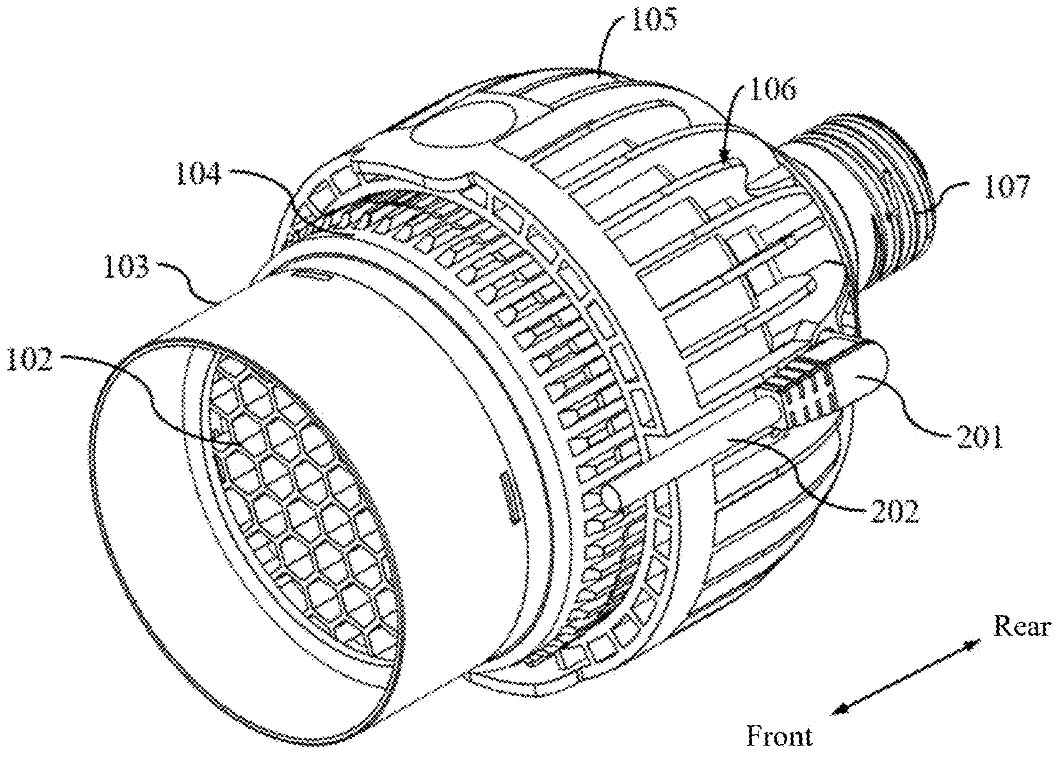
FIG. 2 is a schematic view showing a state in which a plug is plugged into a lamp.

As shown in FIG. 1, in some embodiments, the lamp 101 further includes a socket 108 electrically connected to the light source 115 of the circuit board assembly 114. The socket 108 is fixedly connected to the radiator 117 and is exposed out of the radiator 117. A plug 201 may be plugged into the socket 108 (as shown in FIG. 2), such that an external power supply supplies power to the light source 115 through a cable 202 and the plug 201. Because the lamp 101 is provided with both the socket 108 and the screw cap 107, the lamp 101 can be electrically connected to an external power supply in a variety of manners, such that the lamp 101 can be flexibly used in many scenarios.

Figure 8:
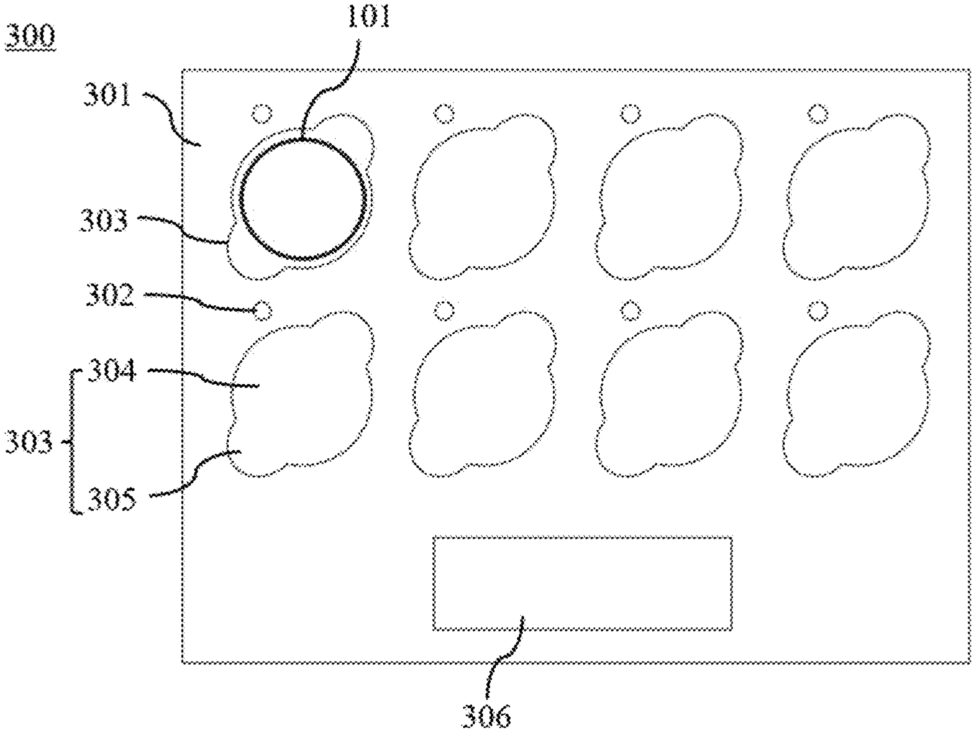
FIG. 8 is a front view of a lighting equipment according to an embodiment of the present disclosure.

As shown in FIG. 8, the present disclosure further provides a lighting equipment 300. The lighting equipment 300 includes a box 301, a power module, and lamps 101 described above (where only one lamp 101 is shown in FIG. 8). As shown in FIG. 8, the box 301 includes a plurality of recesses 303, where each of the recesses 303 is configured to receive one of the lamps 101. The power module is not shown. The power module is mounted in the box 301. When a lamp 101 is arranged in a recess 303, the lamp 101 is electrically connected to the power module. The power module may be an energy storage battery or a rechargeable battery. The power module may be connected to the lamps 101 by connection lines, such that the power module supplies power to all the lamps 101 placed in the lighting equipment 300. As such, there is no need to provide a battery for each lamp 101, providing a basis for simultaneously configuring parameters for all the lamps 101.

Moreover, the lamps 101 can be detached from the recesses 303, so that a user can adjust the number of lamps 101 mounted in the box 301 according to a required brightness of lighting or other requirements. The lighting equipment 300 further includes a control assembly 306. The control assembly 306 is mounted on the box 301. The control assembly 306 may be communicatively connected to the lamps 101 in the recesses 303. The control assembly 306 is configured to control an operational status of the lamps 101. The control assembly 306 may include a plurality of buttons and a display screen. The display screen is configured to display status information of the lighting equipment 300 or the lamps 101. A user may change the state of the lamp 101 by pressing the buttons, for example, change the color of light emitted by the lamp 101, turn on or off the lamp 101, and so on. In other words, the box 301 can accommodate a plurality of lamps 101 at the same time, and the control assembly 306 can simultaneously control the plurality of lamps 101 and simultaneously configure parameters for the plurality of lamps 101, including configuring addresses for the plurality of lamps 101. This solves the problem in the existing technology that a parameter of only one lamp can be set at a time in a large-scale activity, and reduces the time required for configuring parameters for the lamps, thereby improving the efficiency of lamp parameter configuration.

As described above, the lamp 101 may include the screw cap 107 and the socket 108. To electrically connect the lamps 101 to the power module in the box 301, the lighting equipment 300 may further include plugs 201 configured to be respectively plugged into the sockets 108, where one plug 201 is provided in each recess 303, and the plugs 201 are connected to the power module by the cable 202. Alternatively, each recess 303 includes an interface configured to mate with the screw cap 107.

As shown in FIG. 8, the recess 303 includes a central region 304 and two peripheral regions 305 in communication with the central region 304, where the peripheral regions 305 protrudes outward relative to an edge of the central region 304. The central region 304 is configured to accommodate the lamp 101, and the peripheral region 305 allows a user to put a finger into the recess 303 to remove the lamp 101. To prevent damage to the lamp 101, an elastic material such as rubber or foam may further be provided on a wall surface of the recess 303.

In some embodiments, the lighting equipment 300 further includes infrared emitters (not shown), where one or more infrared emitters may be provided in each recess 303. The lamp 101 includes an infrared receiver (not shown). The infrared receiver is integrated in the circuit board assembly 114 and is exposed out of the fixed base 105. The infrared emitter may be arranged in the central region 304 of the recess 303, such that the detection accuracy of the detection unit will not be affected by a finger extending into the peripheral region 305. In addition, the rubber or foam on the wall surface of the recess 303 should not block the infrared emitter. The infrared emitter is configured to emit an infrared signal. Once the lamp 101 is properly placed into the recess 303, the infrared receiver can receive the infrared signal. After the infrared receiver receives the infrared signal, a second communication module of the lamp 101 starts to attempt to establish a wireless communication connection with a first wireless communication module of the lamp 101. The lighting equipment 300 further includes an indicator light 302 mounted on a surface of the box 301 and arranged close to the recess 303. After a lamp 101 in a recess 303 is communicatively connected to the control assembly 306, the indicator light 302 corresponding to the recess 303 is always on, prompting the user that the lamp 101 has been communicatively connected to the control assembly 306. A user may then control the operation of the lamp 101 through the control assembly 306. The first wireless communication module may include at least one of a Bluetooth module, a DMX module, a CRMX module, a UHF module, and a 2.4 G Wi-Fi module. The second wireless communication module may include at least one of a Bluetooth module, a DMX module, a CRMX module, a UHF module, and a 2.4G Wi-Fi module. A user may also control the lighting equipment 300 through a mobile phone, a tablet computer, or other electronic devices. For example, a user may first use a mobile phone to establish communication with the control assembly 306, and then send control instructions to the lighting equipment 300 through the mobile phone.

In the description of the present disclosure, the description with reference to the terms "an embodiment," "some embodiments," "exemplary embodiments," "example," "specific example," or "some example" and so on means that specific features, structures, materials or characteristics described in connection with the embodiment or example are embraced in at least one embodiment or example of the present disclosure. In this specification, exemplary descriptions of the foregoing terms do not necessarily refer to the same embodiment or example. Moreover, the described specific features, structures, materials, or characteristics may be combined in any suitable manner in one or more embodiments.

What is claimed is:

1. A lamp, comprising:

a fixed base;

a light source fixed in the fixed base;

a lens, wherein a light output surface of the light source faces the lens; and a movable ring, wherein the lens is fixedly connected to the movable ring, one of the fixed base and the movable ring comprises a sliding block, another of the fixed base and the movable ring comprises a sliding groove, two ends of the sliding groove are spaced apart along a radial direction of the lens and are spaced apart along a circumferential direction of the lens, the sliding block is slidably arranged in the sliding groove, and when the movable ring is rotated relative to the fixed base, the sliding block slides along the sliding groove, to change a distance between the lens and the light source, wherein the fixed base comprises:

an inner cylinder, wherein the movable ring is sleeved over the inner cylinder, the sliding block is provided on one of the inner cylinder and the movable ring, and the sliding groove is provided on another of the inner cylinder and the movable ring; and a radiator, fixedly connected to the inner cylinder, comprising a plurality of radiator fins, and sleeved over the inner cylinder and the movable ring.

2. The lamp of claim 1, further comprising a light guide column fixed in the fixed base and located between the light output surface and the lens.

3. The lamp of claim 1, further comprising a light shield detachably connected to an end of the movable ring away from the light source, wherein the light shield is arranged at a periphery of the lens.

4. The lamp of claim 3, wherein the movable ring comprises an annular connection portion, the connection portion comprises an end face and a first outer peripheral surface, the end face is located at an end of the connection portion away from the light source, and the first outer peripheral surface surrounds the end face; and the light shield comprises a buckle, the first outer peripheral surface is provided with an engagement groove, the engagement groove comprises an axial segment and a circumferential segment, the axial segment extends along an axial direction of the movable ring, the circumferential segment extends along a circumferential direction of the movable ring, the buckle is slidable in the axial segment and the circumferential segment, one end of the axial segment extends to the end face to form an opening allowing the buckle to pass through on the end face, and another end of the axial segment is in communication with one end of the circumferential segment.

5. The lamp of claim 1, wherein the movable ring comprises a main body and a plurality of anti-skid protrusions, the main body is annular and comprises a second outer peripheral surface, the anti-skid protrusions are connected to the second outer peripheral surface and protrude relative to the second outer peripheral surface, and the plurality of anti-skid protrusions are distributed along a circumferential direction of the movable ring.

6. The lamp of claim 1, further comprising:

a socket fixedly connected to the radiator, exposed out of the radiator, and electrically connected to the light source; and a screw cap connected to the radiator, exposed out of the radiator, and electrically connected to the light source.

7. A lighting equipment, comprising:

a plurality of lamps, each being the lamp of claim 1;

a box comprising a plurality of recesses, wherein each of the recesses is configured to receive a respective one of the lamps; and a power module mounted on the box and electrically connected to the lamps in the respective recesses.

8. The lighting equipment according to claim 7, further comprising infrared emitters, wherein one or more of the infrared emitters are arranged in each of the recesses, each of the lamps further comprises an infrared receiver, the infrared receiver is exposed out of the fixed base, and the infrared receiver is capable of receiving a signal from the respective infrared emitter when the respective lamp is arranged in the respective recess; and the box comprises a first wireless communication module, each of the lamps further comprises a control assembly, the control assembly is configured to control an operational status of the respective lamp, the control assembly comprises a second wireless communication module, and the first wireless communication module is communicatively connected to the second wireless communication module.

9. The lighting equipment according to claim 8, wherein the first wireless communication module comprises at least one of a Bluetooth module, a digital multiplexer (DMX) module, a cognitive radio multiplexer (CRMX) module, an ultra-high frequency electromagnetic wave (UHF) module, and a 2.4 G Wi-Fi module; and the second wireless communication module comprises at least one of a Bluetooth module, a DMX module, a CRMX module, a UHF module, and a 2.4G Wi-Fi module.

10. A lamp, comprising:

a fixed base;

a light source fixed in the fixed base;

a lens, wherein a light output surface of the light source faces the lens, a movable ring, wherein the lens is fixedly connected to the movable ring, one of the fixed base and the movable ring comprises a sliding block, another of the fixed base and the movable ring comprises a sliding groove, two ends of the sliding groove are spaced apart along a radial direction of the lens and are spaced apart along a circumferential direction of the lens, the sliding block is slidably arranged in the sliding groove, and when the movable ring is rotated relative to the fixed base, the sliding block slides along the sliding groove, to change a distance between the lens and the light source; and a light shield detachably connected to an end of the movable ring away from the light source, wherein the light shield is arranged at a periphery of the lens, wherein the movable ring comprises an annular connection portion, the connection portion comprises an end face and a first outer peripheral surface, the end face is located at an end of the connection portion away from the light source, and the first outer peripheral surface surrounds the end face, and wherein the light shield comprises a buckle, the first outer peripheral surface is provided with an engagement groove, the engagement groove comprises an axial segment and a circumferential segment, the axial segment extends along an axial direction of the movable ring, the circumferential segment extends along a circumferential direction of the movable ring, the buckle is slidable in the axial segment and the circumferential segment, one end of the axial segment extends to the end face to form an opening allowing the buckle to pass through on the end face, and another end of the axial segment is in communication with one end of the circumferential segment.

11. A lighting equipment, comprising:

a plurality of lamps, each of the plurality of lamps comprising:

a fixed base;

a light source fixed in the fixed base;

a lens, wherein a light output surface of the light source faces the lens;

a movable ring, wherein the lens is fixedly connected to the movable ring, one of the fixed base and the movable ring comprises a sliding block, another of the fixed base and the movable ring comprises a sliding groove, two ends of the sliding groove are spaced apart along a radial direction of the lens and are spaced apart along a circumferential direction of the lens, the sliding block is slidably arranged in the sliding groove, and when the movable ring is rotated relative to the fixed base, the sliding block slides along the sliding groove, to change a distance between the lens and the light source;

a box comprising a plurality of recesses, wherein each of the recesses is configured to receive a respective one of the lamps;

a power module mounted on the box and electrically connected to the lamps in the respective recesses; and infrared emitters, wherein one or more of the infrared emitters are arranged in each of the recesses, each of the lamps further comprises an infrared receiver, the infrared receiver is exposed out of the fixed base, and the infrared receiver is capable of receiving a signal from the respective infrared emitter when the respective lamp is arranged in the respective recess, wherein the box comprises a first wireless communication module, each of the lamps further comprises a control assembly, the control assembly is configured to control an operational status of the respective lamp, the control assembly comprises a second wireless communication module, and the first wireless communication module is communicatively connected to the second wireless communication module.

12. The lighting equipment according to claim 11, wherein the first wireless communication module comprises at least one of a Bluetooth module, a digital multiplexer (DMX) module, a cognitive radio multiplexer (CRMX) module, an ultra-high frequency electromagnetic wave (UHF) module, and a 2.4 G Wi-Fi module; and the second wireless communication module comprises at least one of a Bluetooth module, a DMX module, a CRMX module, a UHF module, and a 2.4G Wi-Fi module.

* * * * *